Figure 1:
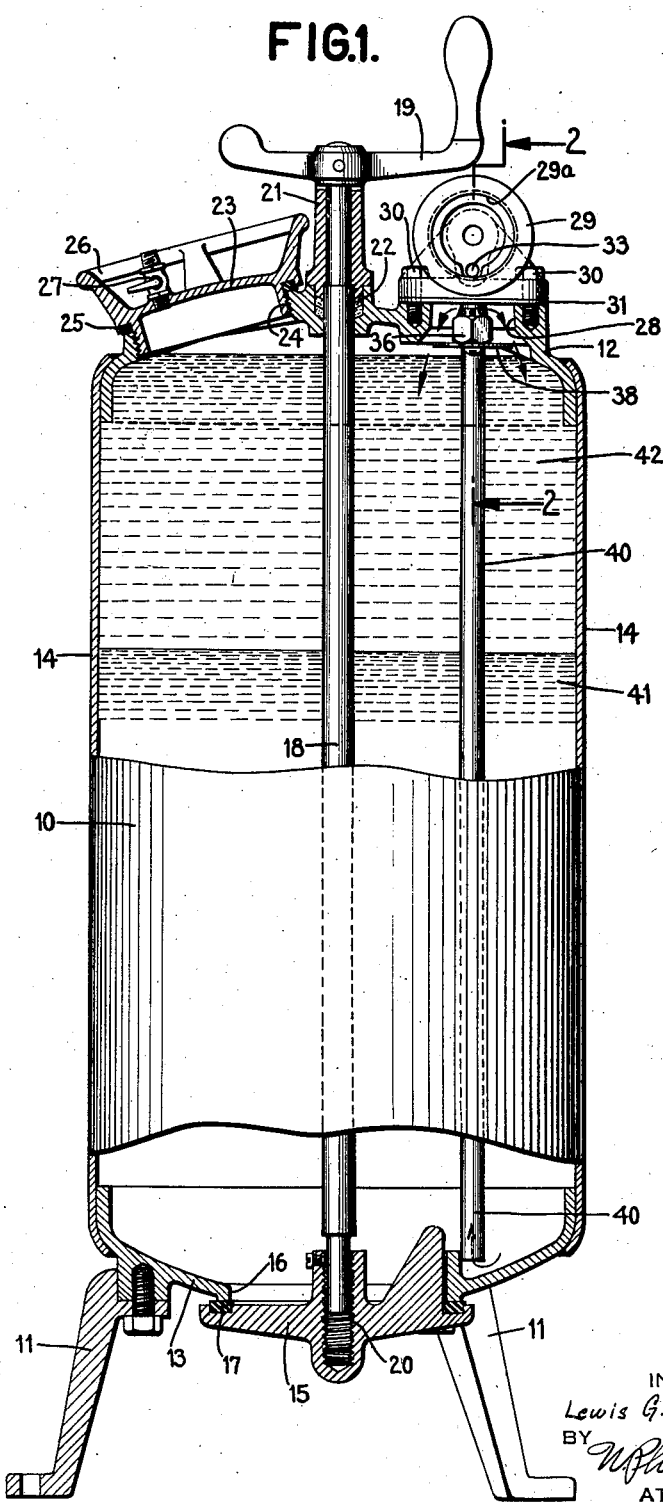

Jan. 23, 1940.  L. G. M. TIMPSON  2,188,066
APPARATUS FOR INJECTING FOAM STABILIZING SOLUTIONS
Filed Oct. 2, 1937   2 Sheets-Sheet 1

INVENTOR
Lewis G. Morris Timpson
BY
ATTORNEY

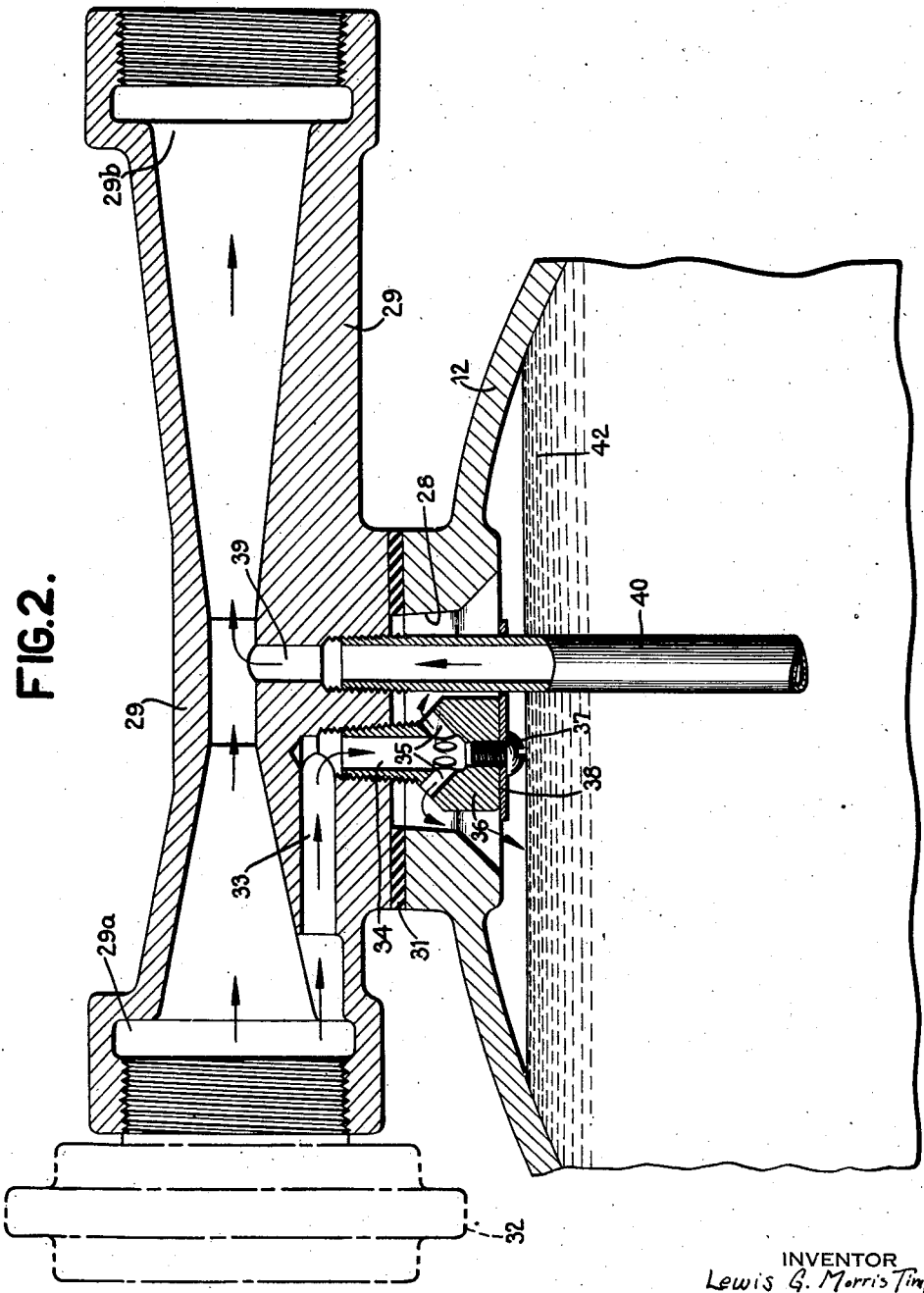

Patented Jan. 23, 1940

2,188,066

UNITED STATES PATENT OFFICE 2,188,066

APPARATUS FOR INJECTING FOAM STABILIZING SOLUTIONS

Lewis G. Morris Timpson, Plainfield, N. J., assignor to Pyrene-Minimax Corporation, Newark, N. J., a corporation of Delaware Application October 2, 1937, Serial No. 166,937

3 Claims. (Cl. 169—14)

This invention relates to apparatus for introducing a solution of foam stabilizing material into a stream of another liquid such as water. More particularly, the invention relates to the introduction of a foam stabilizing solution into a stream of water in accordance with the rate of flow of the water and without materially decreasing the head of the stream to provide a stream of liquid for producing fire extinguishing foam.

In the art of producing fire extinguishing foam, various methods have been used for the introduction of foam stabilizing materials, either in solid form or in solution, into the bulk of the liquid utilized for the production of foam. In these methods of producing foam, water is the principal ingredient and where water is available under a sufficient head, it is particularly desirable to utilize this head, not only for the production of the foam but also for the projection of the foam on the fire. Also, the rate of introduction of foam stabilizing material into a stream of water should be made dependent upon the rate of flow of the water, in order that the foam produced may be of the desired uniform quality.

Heretofore, the introduction of foam stabilizing material into a water stream has required either an independent source of power, such as used with an injector pump, and usually the constant services of operators, or a very substantial loss in head of the water available. Especially where water is taken from a hydrant, it is desirable to preserve this head, so far as possible, for the projection of the foam upon the fire, and independent sources of power for injection frequently are not available near a fire.

An object of my invention is to provide an apparatus for introducing foam stabilizing material in solution into a stream of water without requiring the aid of an independent source of power and without substantial loss of head in the water stream.

It is also an object of my invention to introduce foam stabilizing solution into a water stream at a rate which varies automatically with any variation in the rate of flow of water.

A further object of this invention is to provide an apparatus for accomplishing the foregoing results automatically and without requiring the constant attention of an operator.

A further object of this invention is to provide an apparatus for introducing a foam stabilizing agent which accomplishes the foregoing objects and which may be easily transported to the desired place of use.

The invention will be explained in conjunction with the embodiment of the apparatus illustrated in the accompanying drawings, although it is to be understood that the invention is in no way limited to this embodiment.

In the drawings, Figure 1 is a vertical sectional view of a container for holding foam stabilizing solution and illustrates an injecting apparatus at the top of said container.

Figure 2 is an enlarged scale vertical sectional view of the injecting apparatus on the line 2—2 of Fig. 1 and showing a fragmentary upper portion of the solution container.

With reference to the drawings, numeral 10 indicates a cylindrical container which may be closed and sealed and which is supported in an upright position on suitable legs 11. The container may be conveniently constructed with a top member 12 and a bottom member 13 welded to the cylindrical side wall 14. Suitable means are provided, preferably at the top and bottom of the container, for filling and emptying the same. The emptying arrangement at the bottom of the container may comprise the valve 15 normally held in tight engagement with the rim of the opening 16 and carrying a suitable gasket 17. Valve 15 may be conveniently operated from the top of the container by means of the rod 18 carrying a handle 19 and threaded at its bottom into a central opening 20 in the valve 15. Rod 18 may be journaled in the bearing 21 at the top 12 of the container and preferably passes through a packing gland 22.

The upper portion of the container may be provided with a cap 23 having its lower portion threaded into the filling opening 24 in the top member 12 of the container and suitably provided with a gasket 25, of rubber or other suitable material. The cap 23 may be screwed and unscrewed by means of the handle 26 and, if desired, a petcock 27 may be provided therein to serve as a vent when needed.

Fixed to the top of the container by means of bolts 30, is a Venturi tube 29 which with gasket 31 closes the opening 28 in the container top 12. The entrance end 29a of the Venturi tube 29 may be connected, as by means of the coupling 32 and a suitable hose (not shown), to a hydrant or other source of water under pressure. The pressure of the water passing through the Venturi tube will vary at the different portions of the tube, depending upon the design thereof and the cross sectional area of these portions. A high pressure portion of the Venturi tube is preferably connected through the passageway 33 and the auxiliary tube 34 to the top 12 of the container 10. Auxiliary tube 34 may be threaded into a solid portion of the tube 29 and is preferably provided with a suitable baffling arrangement whereby water passing through the tube 34 is directed upwardly through the passages 35 in the head 36 against the side walls and upper portion of the opening 28. The direct passage of water into the container through the tube 34 may be prevented by the bolt 37 holding the baffle plate 38 in place.

A low pressure portion of the Venturi tube 29 is preferably connected directly through the passageway 39 to a tube 40 which extends down into the container 10 to a point adjacent the bottom thereof and which is open only at its lower end. Water carrying foam stabilizing material will thus flow out of the end 29b of the tube 29.

In the operation of this apparatus, water under pressure, as from a hydrant, is passed through the Venturi tube 29 in the direction of the arrows in Fig. 2. Container 10 has been previously filled with a solution 41 of a foam stabilizing agent and the cap 23 is tightly secured in place, the vent 27 being closed. As the stream of water flows through the Venturi tube, water under considerable pressure at the entering side of the Venturi tube passes by way of the passage 33, tube 34, and the baffle openings 35 into the top of the container 10, thereby creating a considerable pressure on the top of the solution in the container. The lowermost portion of the container is connected to a low pressure portion of the Venturi tube 29 by the tube 40 and the flow of the foam stabilizing agent up through the tube 40 and into the stream of water in the Venturi tube 29 is thus produced. Such a flow through tube 40 will depend upon the pressure differential between the high pressure portion of the venturi and the low pressure portion of the venturi selected, and the rate of flow of foam stabilizing solution through the tube 40 will vary in accordance with the rate of flow of water through the Venturi tube 29. By selecting the points in the Venturi tube 29 at which the tubes 34 and 40 are connected according to the cross sectional areas of the water passage at these points, a predetermined ratio of the rate of solution flow to the rate of water flow may be readily obtained.

As water flows into the top of the containers, the baffling arrangement prevents this water from being projected at high velocity into the foam stabilizing solution, and turbulence and mixing of the water with the foam stabilizing solution is thereby minimized. As foam stabilizing solution flows out of the bottom of the container, its place is taken by the water flowing in at the top, until the foam stabilizing solution has been exhausted. Fig. 1 shows the apparatus during operation after a part of the foam stabilizing solution 41 has been withdrawn from the bottom of the container and has been replaced by the water 42 which has entered at the top thereof. The water is shut off after the solution has been used up, vent 27 is opened, and the dumping valve 15 is opened by means of the handle 19 to remove the water from container 10. The valve 15 may then be closed and the container can be quickly recharged with foam stabilizing solution through the opening 24. If desired, the water under high pressure may be taken from other portions of the water passage or the Venturi tube. For example the tube 34 may be connected to the Venturi tube 29 at the opposite end of the tube from that shown in Fig. 2.

In accordance with my invention, the foam stabilizing solution will be injected into the flowing stream of water at the desired rate of flow and the stream of water carrying the injected foam stabilizing material will be under practically the same head as the stream of water approaching the Venturi tube 29. Any loss in head will be extremely small.

While the stream of water carrying foam stabilizing material as it leaves Venturi tube 29 will be useful in connection with most methods of producing fire extinguishing foam, it is particularly valuable when employed for the production of the so-called air foam, in which air is aspirated by a stream of water in accordance with the principle described in the Wagener Patent No. 1,821,914. In the art of producing air foam, it is very important to maintain the head of the water so that there will be sufficient energy present in the resultant foam stream for projection upon the fire.

In the operation of the apparatus illustrated, the end 29b of Venturi tube 29 is preferably connected to a suitable device for introducing air into the stream by the aspiration action thereof to produce fire extinguishing foam. Suitable apparatus for this purpose, which may be connected to the end 29b of the Venturi tube, is shown and described in my Patent Number 2,057,218 and in my copending applications Serial No. 742,042, filed August 30, 1934 (now Patent 2,146,605, dated Feb. 7, 1939), and Serial No. 15,010, filed April 6, 1935.

In the aspiration of air, a considerable amount of energy of the stream is lost, depending upon the volume of air aspirated and, consequently, it is particularly important in this art to introduce the foam stabilizing solution into the stream of water with as little loss of head as possible. The use of other sources of power, such as booster pumps, or power injectors for this purpose are necessary otherwise and detract from the mobility of the apparatus. Apparatus in accordance with this invention accomplishes the objects thereof in a simple manner, can be readily used where only hydrant water is available for producing and projecting foam, and provides a uniform quality of foam even though the pressure of the water available should vary from time to time.

In the specific embodiment of the apparatus illustrated, the solution of foam stabilizing material is shown as taken from the bottom of the container 10. This will be preferred where the foam stabilizing solution has a specific gravity greater than that of water. Where the foam stabilizing solution is lighter than water, it will be apparent that the connections to the Venturi tube may be reversed to introduce water under higher pressure into the bottom of the container 10 and to withdraw the solution from the top thereof.

In the practical operation of this invention it is also desirable to employ a container 10 of as small a cross sectional area as practical, in order to provide a relatively small area of contact between the water and solution with less diffusion between the two during operation of the device.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. Apparatus for introducing a solution of foam stabilizing material into a stream of water comprising a passage for said stream constructed and arranged to provide different pressures of water in different portions thereof by altering the velocity of said stream without more than normal losses in pressure due to friction, a closed container for a solution of foam stabilizing material, means for introducing water from a high pressure portion of said passage into said container, baffle means for obstructing direct flow of water into the container through said introducing means, and means for withdrawing solution from said container at a point remote from the introduction of water and introducing said solution into a low pressure portion of said passage.

2. In apparatus for producing fire extinguishing foam by aspirating air into water containing a foam stabilizing agent, means for introducing a solution of foam stabilizing material into a stream of water comprising a passage for said stream including a Venturi section to provide different pressures of water in different portions thereof, a closed container for a solution of foam stabilizing material, means for introducing water from a high pressure portion of said passage into the top of said container through a baffle for reducing velocity and turbulence of the water entering said container, and means for withdrawing solution from the bottom of said container and introducing said solution into a low pressure portion of said passage.

3. Apparatus for introducing a solution of foam stabilizing material into a stream of water comprising a passage for said stream including a Venturi section, a closed container for a solution of foam stabilizing material, conduit means connecting a portion of said passage of larger cross-sectional area to said container, baffle means for minimizing intermingling of water from said conduit means and solution in said container, and a second conduit means connecting a portion of said section of smaller cross-sectional area to said container for introducing said solution into said stream.

LEWIS G. MORRIS TIMPSON.